H. S. BLACKMORE.
PROCESS OF GENERATING ELECTRICITY.
APPLICATION FILED APR. 29, 1907.

939,183.

Patented Nov. 2, 1909.

WITNESSES
Frank L. Taylor.
J. R. Nottingham

INVENTOR.
Henry Spencer Blackmore

UNITED STATES PATENT OFFICE.

HENRY SPENCER BLACKMORE, OF MOUNT VERNON, NEW YORK.

PROCESS OF GENERATING ELECTRICITY.

939,183.      Specification of Letters Patent.      Patented Nov. 2, 1909.

Original application filed April 18, 1903, Serial No. 153,329. Divided and this application filed April 29, 1907. Serial No. 370,799.

*To all whom it may concern:*

Be it known that I, HENRY SPENCER BLACKMORE, a citizen of the United States, residing at Mount Vernon, in the county of Westchester and State of New York, have invented certain new and useful Improvements in Processes of Generating Electricity, of which the following is a specification, being a division from Serial No. 153,329, filed April 18, 1903.

The object of my invention is to generate electricity by chemical or thermo-chemical means, and it consists in employing molten or fluid electrolyte in conjunction with electrodes containing metal and carbon, either as carbid, acetylid, or other union, in which condition either the metal or carbon content, or both, have a natural affinity for the electronegative constituents of the compound employed as electrolyte, which affinity, when exercised during chemical reaction, evolves energy in the form of electricity.

As an illustration of my invention I will take for example, the generation of electricity during the reduction of aluminium from its oxy-fluorid, or the equivalent thereof, consisting of employing a molten bath of chlorid of calcium, with calcium carbid as anode and add thereto a mixture of aluminium oxid and fluorid from time to time, which aluminium oxid and fluorid will be dissociated or reduced by the action of the calcium carbid in accordance with my process as covered by U. S. Letters Patent #699,282 dated May 6, 1902, the chemical action being illustrated by the following chemical formula or equation:

$$Al_2F_6 + 2Al_2O_3 + 3CaC_2 = 6Al + 3CaF_2 + 6CO.$$

This process may be carried out as a direct means for generating electricity so long as the electrolyte is maintained in a fluid condition, which may be accomplished by application of heat external of the current-generating electrodes, the current being taken off by suitable conductors.

The apparatus which I prefer to employ in carrying out my process for generating electricity is illustrated in the accompanying drawing, in which—

Figure 1:
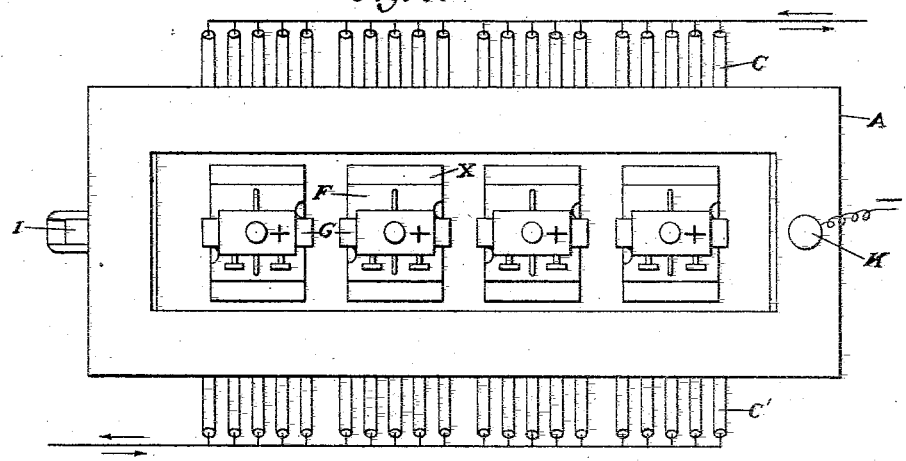
Figure 2:
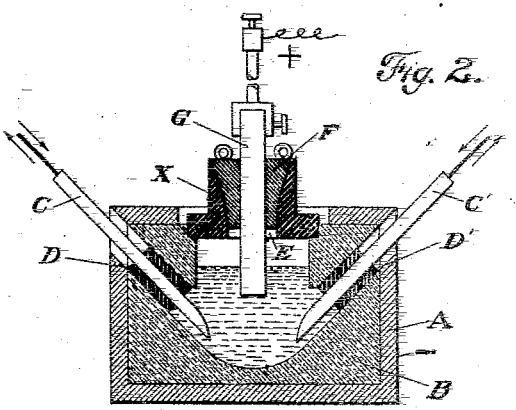
Figure 3:
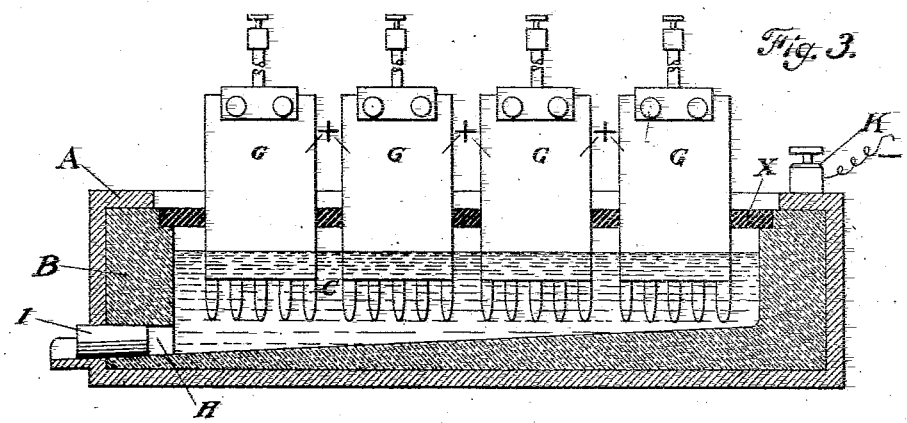

Figure 1 is a plan or top view; Fig. 2 is a transverse vertical section; and Fig. 3 is a longitudinal vertical section.

In referring to the drawing, the letter A designates a box or receptacle, preferably of cast-iron, lined with a conductive substance, such as carbon B, into which project the electrodes C, C', which pass through the insulators D, D'. The material is introduced into the apparatus through the openings E which are closed by the insulating covers or plugs F passing into the insulating cover X through which passes the electrode G which consists of or contains the carbid of a metal more electro-positive than the metal to be reduced.

In the operation of the process I place in the apparatus a quantity of calcium chlorid and fuse the same by passing an alternating electric current therethrough between the electrodes C, C'. I then add from time to time quantities of calcium chlorid until the interior of the apparatus has been sufficiently filled. I then add to the molten content a mixture of aluminium fluorid and aluminium oxid whereupon a reducing action is set up between the carbid contained in the electrode G, such as calcium carbid, and the electronegative constituents fluorin and oxygen of the aluminium fluorid and oxid supplied thereto, the fluorin combining with the calcium of the calcium carbid and the oxygen with the carbon thereof, at the same time separating metallic aluminium which accumulates in the bottom of the apparatus and is withdrawn from time to time through the tap-hole H by removing the tap-hole plug I. By supplying new anodes G and fresh aluminium oxid and fluorid from time to time, withdrawing the metal reduced and the accumulating fluorids, the process may be carried on continuously, while the materials are maintained in a molten condition by means of the alternating electric current passing between the electrodes C, C', while at the same time by connecting the apparatus B through the binding post K with the electrode G, an electric circuit may be established and the current, generated during the reduction of the metal, utilized in any convenient manner. By action of the current passed through and between electrodes C, C', the electrolyte is heated and maintained at a temperature of about 1800 degrees F., the reacting ingredients generating an electromotive force of about one and eight-tenths volts.

I can substitute aluminium carbid or any other practical carbid for the calcium carbid without departing from the spirit of my invention, which consists in employing a metal carbid or its equivalent as electrode in conjunction with fluid electrolytes in the generation of electricity.

The anode may consist of a mixture of calcium or other carbid with carbon or other binder or may consist wholly of the carbid the essential feature being that the electrode contains a carbid of some form.

The apparatus illustrated in the accompanying drawing, is for the purpose of more clearly describing the process and is shown to more particularly identify the invention and differentiate the same from the prior art, and is the same as intended for the purpose of the process as originally described, except to certain features in reference to means for maintaining fusion of electrolyte, or electrolyte and vehicle therefor, which means were not specifically described and are not herein claimed but are merely illustrative of the process.

Instead of metal oxy-fluorid or its equivalent I can employ any other oxy-haloid or any substance containing metal and one or more electro-negative elements or a metal oxid *per se*, so long as the electro-negative elements are capable of combining with an element of the metal carbid electrode.

The term "molten" or "fluid" used in this specification and claims with relation to the character of the electrolyte is intended to include any fluid form of electrolyte, normal or otherwise, which may be adapted or employed for the purpose set forth, be it in liquid, liquefied, or other fluid form, and the term "containing" as applied to the carbid electrodes is intended to imply an electrode which may consist wholly or in part of carbid or species thereof.

It should be noted that compounds, such as carbids, metal carbids, acetylids, are compounds which absorb or retain energy on formation and which discharge the same on decomposition or transformation, and are particularly adaptable as a source of electricity, for the reason that electrical energy in excess of that obtainable from the elements forming the compound *per se* may be secured.

It is obvious that the electricity evolved or generated may be secured in any convenient manner and through the mediation of suitable communicating conductors, the term "communicating" implying any form of communication of the conductors, so long as the electricity can be obtained.

Having now described my invention, what I claim as new and desire to secure by Letters Patent is:—

1. The process of generating electricity, which consists in employing a molten electrolyte having in communication therewith electrodes one of which is more electro-positive than the other and contains metal carbid decomposable by the electrolyte, the said electrodes being separated from each other by a body of the electrolyte.

2. The process of generating electricity, which consists in employing a body of electrolyte having in communication therewith electrodes one of which is more electro-positive than the other and consists of a metal carbid decomposable by the electrolyte, the said electrodes being separated from each other by a body of the electrolyte.

3. The process of generating electricity, which consists in employing a body of electrolyte having in communication therewith electrodes one of which consists of a carbid decomposable by the electrolyte, and the other a substance more electro-negative than the base of the carbid, the said electrodes being separated from each other by a body of electrolyte.

4. The process of generating electricity, which consists in employing a body of molten electrolyte having in communication therewith electrodes one of which contains a metal carbid decomposable by the electrolyte and one of which is more electro-positive than the other, and maintaining the electrolyte which is in contact with the electrodes in a molten condition by a source of heat applied external to the carbid electrode.

5. The process of generating electricity, which consists in employing a body of electrolyte having in communication therewith electrodes one of which contains a metal carbid decomposable by the electrolyte and one of which is more electro-positive than the other, and maintaining the electrolyte which is in contact with the electrodes in an active condition by a source of heat applied external to the carbid electrode.

6. The process of generating electricity, which consists in employing a body of molten fluid having in communication therewith electrodes one of which contains a metal carbid decomposable by the electrolyte and one of which is more electro-positive than the other, said electrodes being separated from each other by a body of electrolyte maintained in a fluid condition by a source of heat independent of and external to the carbid electrode.

7. The process of generating electricity, which consists in exposing electrodes one of which contains a metal carbid decomposable by the electrolyte and one of which is more electro-positive than the other, to the action of a substance maintained in a fluid condition by a source of heat independent of and external to the carbid electrode.

8. The process of generating electricity, which consists in subjecting electrodes one of which contains a metal carbid decomposable by the electrolyte and one of which is more electro-positive than the other, to the action of an electrolyte acted upon by energy applied independent of and external to the electrodes.

9. The process of generating electricity, which consists in exposing an electrode composed of a carbid and a binder to the action of a form of energy capable of changing the same with evolution of energy characterized as electricity.

10. The process of generating electricity, which consists in exposing an electrode containing a carbid and a binder to the action of a form of energy capable of changing the same with evolution of energy characterized as electricity.

11. The process of generating electricity, which consists in exposing an electrode containing a carbid and a binder capable of conducting electricity to the action of a form of energy capable of changing the same with evolution of energy characterized as electricity.

12. The process of generating electricity, which consists in exposing an electrode composed of a carbid and a carbon binder to the action of a form of energy capable of changing the same with evolution of energy characterized as electricity.

13. The process of generating electricity, which consists in exposing an electrode containing a carbid and a carbon binder to the action of a form of energy capable of changing the same with evolution of energy characterized as electricity.

14. The process of generating electricity, which consists in exposing an electrode composed of a metal carbid and a binder to the action of a form of energy capable of changing the same with evolution of energy characterized as electricity.

15. The process of generating electricity, which consists in exposing an electrode containing a metal carbid and a binder to the action of a form of energy capable of changing the same with evolution of energy characterized as electricity.

16. The process of generating electricity, which consists in exposing an electrode containing a metal carbid and a binder capable of conducting electricity to the action of a form of energy capable of changing the same with evolution of energy characterized as electricity.

17. The process of generating electricity, which consists in exposing an electrode composed of a metal carbid and a carbon binder to the action of a form of energy capable of changing the same with evolution of energy characterized as electricity.

18. The process of generating electricity, which consists in exposing an electrode containing a metal carbid and a carbon binder to the action of a form of energy capable of changing the same with evolution of energy characterized as electricity.

19. The process of generating electricity, which consists in employing, as a source of energy, a carbid-containing electrode, in communication with a substance decomposable thereby.

20. The process of generating electricity, which consists in employing, as a source of energy, a metal carbid-containing electrode, in communication with a substance decomposable thereby.

21. The process of generating electricity, which consists in exposing electrodes, one of which is more electropositive than the other, and one of which contains a carbid, to the action of a fluid capable of decomposing the carbid.

22. The process of generating electricity, which consists in exposing a fluid electrolyte to the action of a carbid-containing electrode and a more electronegative electrode.

23. The process of generating electricity, which consists in exposing a fluid electrolyte to the action of a carbid electrode and a more electronegative electrode.

24. The process of generating electricity, which consists in exposing a fluid electrolyte to the action of a calcium-carbid-containing electrode and a more electronegative electrode.

25. The process of generating electricity, which consists in exposing a fluid electrolyte to the action of a calcium carbid electrode and a more electronegative electrode.

26. The process of generating electricity, which consists in exposing a molten electrolyte to the action of a carbid-containing electrode and a more electronegative electrode.

27. The process of generating electricity which consists in exposing a molten electrolyte to the action of a carbid electrode and a more electronegative electrode.

28. The process of generating electricity, which consists in exposing a molten electrolyte to the action of a calcium-carbid-containing electrode and a more electronegative electrode.

29. The process of generating electricity, which consists in exposing a molten electrolyte to the action of a calcium carbid electrode and a more electronegative electrode.

30. The process of generating electricity, which consists in exposing a fluid electrolyte to the action of a carbid-containing anode and a more electronegative electrode.

31. The process of generating electricity, which consists in exposing a fluid electrolyte to the action of a carbid anode and a more electronegative electrode.

32. The process of generating electricity, which consists in exposing a fluid electrolyte to the action of a calcium-carbid-containing anode and a more electronegative electrode.

33. The process of generating electricity, which consists in exposing a fluid electrolyte to the action of a calcium carbid anode and a more electronegative electrode.

34. The process of generating electricity, which consists in exposing a molten electrolyte to the action of a carbid-containing anode and a more electronegative electrode.

35. The process of generating electricity which consists in exposing a molten electrolyte to the action of a carbid anode and a more electronegative electrode.

36. The process of generating electricity, which consists in exposing a molten electrolyte to the action of a calcium-carbid-containing anode and a more electronegative electrode.

37. The process of generating electricity, which consists in exposing a molten electrolyte to the action of a calcium carbid anode and a more electronegative electrode.

38. The process of generating electricity, which consists in exposing an electrolyte to the action of differing electrodes one of which contains carbid.

39. The process of generating electricity, which consists in exposing an electrolyte to the action of differing electrodes one of which contains a metal carbid.

40. The process of generating electricity which consists in exposing an electrolyte to the action of differing electrodes one of which is carbid.

41. The process of generating electricity, which consists in exposing an electrolyte to the action of differing electrodes one of which is metal carbid.

42. The process of generating and obtaining energy, evolved as electricity, on the changing of metal-carbon-containing compounds, which process consists in exposing said compounds to a form of energy capable of changing the same, while in communication with substances capable of discharging or conveying electrical energy, whereby electricity may be secured through suitable conductors in communication therewith.

43. The process of generating and obtaining energy, evolved as electricity on the changing of endothermic compounds, which process consists in exposing said compounds to a form of energy capable of changing the same, while in communication with substances capable of discharging or conveying electrical energy, whereby electricity may be secured through suitable conductors in communication therewith.

44. The process of generating and obtaining energy, evolved as electricity on the changing of acetylids, which process consists in exposing said compounds to a form of energy capable of changing the same, while in communication with substances capable of discharging or conveying electrical energy, whereby electricity may be secured through suitable conductors in communication therewith.

45. The process of generating and obtaining energy, evolved as electricity on the changing of metal acetylids, which process consists in exposing said compounds to a form of energy capable of changing the same, while in communication with substances capable of discharging or conveying electrical energy, whereby electricity may be secured through suitable conductors in communication therewith.

46. The process of generating and obtaining energy, evolved as electricity on the changing of carbids, which process consists in exposing said carbid to a form of energy capable of changing the same, while in communication with substances capable of discharging or conveying electrical energy, whereby electricity may be secured through suitable conductors in communication therewith.

47. The process of generating and obtaining energy, evolved as electricity on the changing of metal carbids, which process consists in exposing said metal carbid to a form of energy capable of changing the same, while in communication with substances capable of discharging or conveying electrical energy, whereby electricity may be secured through suitable conductors in communication therewith.

48. The process of generating and obtaining energy, evolved as electricity on the changing of calcium carbid, which process consists in exposing said calcium carbid to a form of energy capable of changing the same, while in communication with substances capable of discharging or conveying electrical energy, whereby electricity may be secured through suitable conductors in communication therewith.

In testimony whereof I affix my signature in presence of two witnesses.

HENRY SPENCER BLACKMORE.

Witnesses:
  E. M. HOLMES,
  J. R. NOTTINGHAM.